Figure 1:
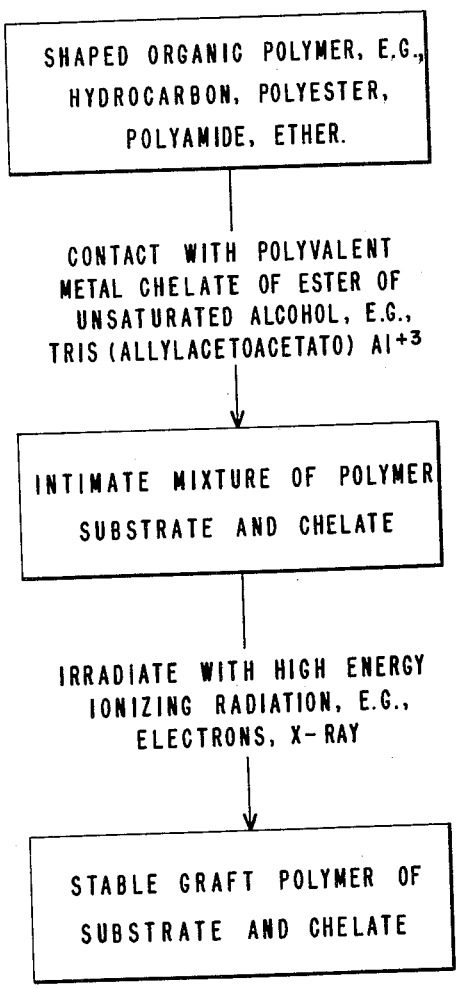

Dec. 11, 1962     E. T. CLINE ETAL     3,068,122
SELECTED GRAFT POLYMERS AND THEIR PREPARATION

Filed March 10, 1958     2 Sheets-Sheet 1

INVENTORS
EDWARD T. CLINE
DAVID TANNER

BY

ATTORNEY

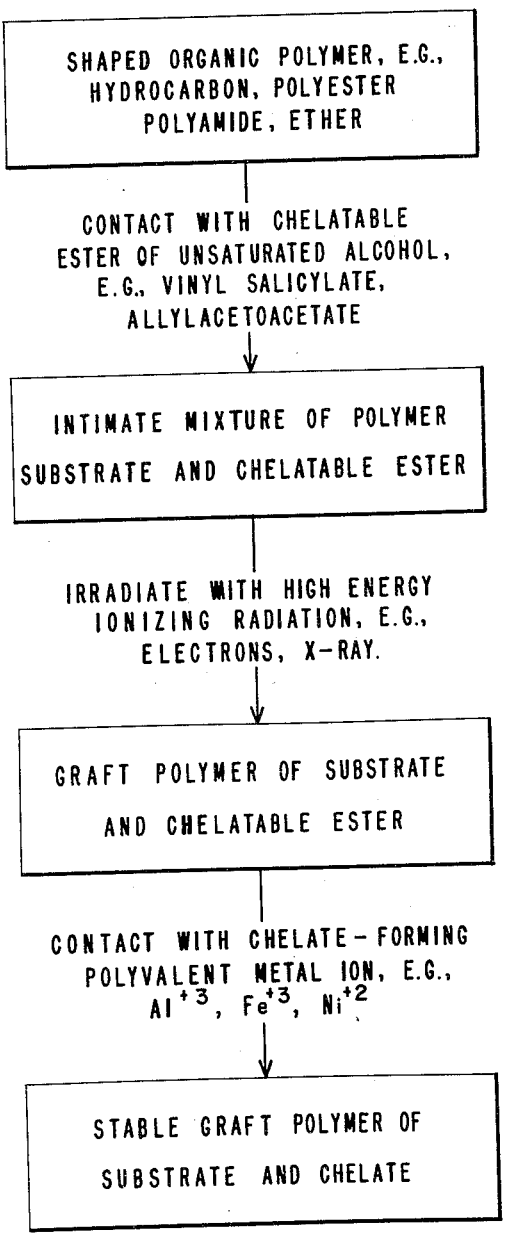

United States Patent Office 3,068,122
Patented Dec. 11, 1962

3,068,122
SELECTED GRAFT POLYMERS AND THEIR
PREPARATION
Edward T. Cline and David Tanner, Wilmington, Del., assignors to E. I. du Pont de Nemours and Company, Wilmington, Del., a corporation of Delaware
Filed Mar. 10, 1958, Ser. No. 720,038
29 Claims. (Cl. 117—138.8)

This invention is concerned with organic polymers of improved thermal resistance and with a process for their preparation.

Most of the organic polymers which have found utility in the form of fibers or films are thermoplastic materials, which depend on their thermoplastic characteristics for ready conversion into fiber and film form. The thermoplasticity which permits practical fabrication of these materials at the same time limits their thermal resistance in fabricated form. A method for converting shaped structures of thermoplastic polymers into modifications characterized by form stability at higher temperatures and improved durability on contact with heated objects is highly desirable.

An object of this invention is consequently provision of a process for improving the thermoplastic characteristics of preshaped organic polymers.

Another object is provision of novel polymers of improved thermoplastic properties.

The above-mentioned and yet other objects are achieved in accordance with this invention by a process in which preshaped organic polymers of conventional types are converted into novel graft polymers. The resultant composite or graft polymer consists of a substrate of the conventional polymer having grafted thereupon a chelate of a suitable chelatable organic ligand. The process yielding this chelated graft polymer consists broadly in subjecting to ionizing radiation a preformed organic polymer in intimate contact with an unsaturated ligand or chelate thereof, the ligand if employed being subsequently converted to its chelate by reaction with a polyvalent metal ion.

The invention will be immediately evident from the self-explanatory drawings in which:

FIG. 1 is a flow-sheet illustrating that aspect of the invention in which a preformed chelate is bonded to a shaped organic polymer by means of ionizing radiation, a stable graft polymer being the ultimate product; and FIG. 2 is a flow-sheet illustrating the aspect of the invention in which a chelatable ester is bonded to a shaped organic polymer by means of ionizing radiation and then chelated, a stable graft polymer again being the ultimate product.

Suitable "ionizing radiations" for use in bonding unsaturated ligands and their chelates to organic polymers include both radiation in the form sometimes regarded as particle radiation and radiation in the form sometimes regarded as ionizing electromagnetic radiation.

By "particle radiation" is meant a stream of particles such as electrons, protons, neutrons, alpha-particles, deuterons, beta-particles, or the like, so directed that the said particles impinge upon the unsaturated ligand or chelate and the organic polymer. The charged particles may be accelerated by means of a suitable voltage gradient, using such devices as a cathode-ray tube, resonant cavity accelerator, a Van de Graaff accelerator, a Cockcroft-Walton accelerator, or the like, as is well known to those skilled in the art. Neutron radiation may be produced by suitable nuclear reactions, e.g., bombardment of a beryllium target with deuterons or alpha-particles. In addition, particle radiation suitable for carrying out the process of this invention may be obtained from an atomic pile, or from radioactive isotopes or from other natural or artificial radioactive materials.

By "ionizing electromagnetic radiation" is meant radiation of the type produced when a metal target (e.g., gold or tungsten) is bombarded by electrons possessing appropriate energy. Such radiation is conventionally termed X-ray. In addition to X-rays produced as indicated above, ionizing electromagnetic radiation suitable for carrying out the process of the invention may be obtained from a nuclear reactor ("pile") or from natural or artificial radioactive material. In all of these latter cases the radiation is conventionally termed gamma rays.

It is recognized that the energy characteristics of one form of ionizing radiation can be expressed in terms which are appropriate for another form. Thus, one may express the energy of either the particles of radiation commonly considered as particle radiation or of the photons of radiation commonly considered as wave or electromagnetic radiation in electron volts (ev.) or million electron volts (mev.). In the irradiation process of this invention, radiation consisting of particles or photons having an energy of 50 ev. and over may be employed and particles or photons having an energy of 0.001 mev. and over are preferred. With radiation of this type, attachment of an unsaturated ligand or chelate to an organic polymer can be obtained with a minimum length of exposure to the radiation permitting maximum efficiency in utilization of the radiation. Particles or photons with an energy equivalent up to 4 mev. are the most useful from a practical standpoint, although radiation with energies of 10 mev. and higher may be employed.

Unsaturated ligands suitable for use in this invention are those chelate-forming compounds which, in addition to the chelating structures, contain at least one unit of olefinic or acetylenic carbon-to-carbon unsaturation. It appears probable that this unsaturation serves as a site for grafting the ligand to the organic polymer substrate. As employed in this specification, the term "ligand" refers to a chelating or chelate-forming structure.

A summary of the chemistry of chelate-forming compounds (ligands) is given by H. Diehl in an article entitled "The Chelate Rings," Chem. Revs. 21, 39–111 (1937). A more extensive review is found in "Chemistry of the Metal Chelate Compounds," by Martell and Calvin, Prentice-Hall, Inc., New York, 1952. Another discussion appears in Gilman's "Organic Chemistry—An Advanced Treatise," second edition, John Wiley & Sons (1943), vol. 2, the chapter entitled "Modern Electronic Concepts of Valence," by J. H. Johnson, particularly pages 1868–1883.

A chelating or chelate-forming structure (i.e., a ligand) is one which contains at least two donor groups so located with respect to each other that they are capable of forming a chelate ring with a metal, the chelate ring being normally of five or six members. Although chelate rings of other sizes are known, those containing five or six members are the most stable and, in fact, represent the preferred species of this invention. Donor groups are well known and recognized in chelate chemistry, the principal ones being those shown by Martell and Calvin on page 168, i.e., primary amino, secondary amino, tertiary amino, oxime, imino, substituted imino, thioether, keto, thioketo, hydroxyl.thioalcohol, carboxylate, phosphonate, and sulfonate. The most important donor groups therefrom, are those which contain oxygen, sulfur, or nitrogen as the donor atoms.

Metals which participate readily in chelate formation include Mg, Ca, Sr, Ba, Al, Ga, In, Tl, Ti, Zr, Th, Si, Ge, Sn, $V^V$, $V^{IV}$, $Cb^V$, $Ta^V$, $Mo^V$, $U^{VI}$, $U^{IV}$, $Fe^{III}$, $Co^{II}$, Be, $Cr^{III}$, $Fe^{II}$, platinum metals, $Cu^I$, $Ag^I$, $Au^I$, $Cu^{II}$, Zn, Cd, Hg, $V^{III}$, $Co^{III}$, and $Ni^{II}$. Metals of this list preferred from the standpoint of the invention are those which, in the free state, have a density greater than 2.

Of the unsaturated ligands useful in the present invention, a preferred class is the esters of unsaturated alcohols with ligand acids. This class of compounds is illustrated by the ester of unsaturated alcohols, such as:

| | |
|---|---|
| Vinyl alcohol | Oleyl alcohol |
| Allyl alcohol | Linoleyl alcohol |
| Crotyl alcohol | 2-cyclohexenol |
| Methallyl alcohol | 1-allylcyclopentanol |
| 3-pentene-1-ol | o-Vinylphenol |
| Divinylcarbinol | Cinnamyl alcohol |
| 3-hexene-1-ol | Propargyl alcohol |
| 1,5-hexadiene-3-ol | 3-hexyn-1-ol |
| 2-octene-1-ol | Diisopropylethynylcarbinol |
| ω-Undecylenyl alcohol | Phenylethynylcarbinol | with ligand acids, such as:

| | |
|---|---|
| Acetoacetic | 2-thenoylacetic |
| Trichloroacetoacetic | α-Benzoylpropionic |
| Trifluoroacetoacetic | α-Benzoylacetoacetic |
| Propionacetic | α-Acetylacetoacetic |
| Butyroacetic | β-Hydroxypropionic |
| Caproacetic | Lactic |
| α-Acetopropionic | α-Hydroxybutyric |
| γ-Ethoxyacetoacetic | 10-hydroxystearic |
| Salicylic | 9-hydroxystearic |
| α-Acetophenylacetic | Glyceric |
| Benzoylacetic | 9,10-dihydroxystearic |
| 2-furoylacetic | |

For useful effects, the amount of the grafted chelated ligand should not be less than 1% of the weight of the organic polymer. Conversely, amounts in excess of 75% of the weight of the polymer have no known beneficial effects.

Organic polymers suitable as substrates in this invention include any normally solid organic polymeric material, particularly those with molecular weights in excess of 500 and especially in excess of 1000. The polymers may be oriented or unoriented and are shaped prior to irradiation. Thus, there may be employed hydrocarbon polymers, such as polyethylene, polystyrene, polybutadiene, rubber, polyisobutylene, butadiene/styrene copolymers and the like; halogenated hydrocarbon polymers, such as polyvinyl chloride, polyvinylidene chloride, polychloroprene, polytetrafluoro-ethylene, polyvinyl fluoride and the like; ester-containing polymers, such as polyvinyl acetate, polymethyl methacrylate, polyethylene terephthalate and the like; hydroxy-containing polymers, such as polyvinyl alcohol, cellulose, regenerated cellulose and the like; ether-containing polymers, such as solid polytetrahydrofuran, polyformaldehyde, dioxolane polymers and the like; condensation polymers, such as phenolformaldehyde polymers, urea-formaldehyde polymers, triazineformaldehyde polymers, polyamides, polyesters, polyimides and the like; polyacrylonitrile, polyvinyl acetals and mixtures or copolymers based on two or more of the above compounds, as well as natural polymers such as cotton, wool, silk and the like.

A minimum dosage of at least 100 rads is necessary since lower dosages do not give useful amounts of grafting. The amount of unsaturated ligand or chelate bonded to the organic polymer by a given dose in rads usually increases with decreasing beam intensity. Dosages as high as $10^8$–$10^{10}$ rads and over may be employed, although dosages in excess of $10^{10}$ rads are generally to be avoided since they tend to degrade the polymer substrate. The exposure may be carried out in one slow pass or in several faster ones and may be conducted at any convenient rate of energy input. One rad is the quantity of radiation which will result in an absorption of 100 ergs per gram of irradiated material.

The process of this invention may be carried out over a wide range of temperatures, i.e., from low temperatures of the order of −80° C. and below to 300° C. and above, the upper limit being determined by the thermal stability of the particular polymer/ligand or polymer/chelate composition being irradiated. For maximum penetration of the ligand or chelate into the polymer substrate prior to grafting, preheating and irradiation at temperatures in the range of 50–150° C. are preferred.

When minimum dosages of radiation (i.e., 100 rads) are employed, it is desirable, though not essential, to limit the access of oxygen during irradiation, such as by operating in an evacuated space or under a blanket of an inert gas, such as nitrogen, argon, helium, or the like. With higher radiation dosages of $10^4$ rads and above, the effect of oxygen can usually be disregarded.

In the following examples, parts are by weight unless otherwise indicated. Example 6 represents a preferred embodiment of the invention.

EXAMPLE 1

A fabric of 66 nylon (1.548 parts) is folded to a thickness of 0.027 g./cm.$^2$ and is wet with vinyl salicylate, wrapped in aluminum foil, and exposed to 500 watt-sec./cm.$^2$ of 2 mev. electron radiation from a Van de Graaff generator during a period of about 1.5 hours. The sample is passed under the electron beam 40 times with a total exposure to the direct beam of about 45 seconds. Based on the stopping power of polystyrene, a closely related material as fas as electron peneration is concerned, for 2 mev. electrons as published by L. V. Spencer, Phys. Rev. 98, 1597–1615 (1955), the radiation absorbed by the sample is calculated to be about $5 \times 10^7$ rads neglecting the thin aluminum covering (0.002 cm. thick). Excess vinyl salicylate and unattached vinyl salicylate polymer are removed from the fabric by rinsing three times in benzene, followed by extraction with benzene in a Soxhlet extractor for two hours. The fabric is then immersed in a solution of 1 part of aluminum isopropoxide in 8.8 parts of benzene at room temperature for 16 hours. The solution is then heated at reflux for one hour, after which the fabric, now modified by a coating of the aluminum chelate of the grafted vinyl salicylate, is rinsed in benzene, dried, and laundered in a 0.125% aqueous solution of a commercial detergent in a mechanically agitated washer at 70° C. for ½ hour. The laundered fabric, after drying, weighs 1.573 parts.

EXAMPLE 2

A fabric of 66 nylon (1.512 parts) is folded to a thickness of 0.026 g./cm.$^2$ and is wet with allyl acetoacetate, wrapped in aluminum foil, and irradiated with the same dosage of 2 mev. electrons as in Example 1, with the exception that the 40 passes under the beam are made over a period of one hour instead of 1.5 hours. The resulting fabric containing bonded allyl acetoacetate is light yellow in color. It is rinsed in acetone and dried in air. The fabric is then extracted with acetone and dried two more times to remove excess allyl acetoacetate and unattached polymer. The fabric is dried under vacuum for ½ hour at room temperature and immersed in 44 parts of benzene.

A stock solution containing 1 part aluminum isopropoxide in 88 parts of benzene is prepared, and 5.8 parts of this stock solution is added to the benzene in which the fabric is immersed. After one hour, another 5.8 parts of the stock solution is added and at the end of the second hour another 5.8 parts is added. After another hour, 17.6 parts of the stock solution is added. The solution is let stand for one hour, after which the fabric is removed, rinsed with benzene, and dried. It is then laundered by the procedure noted in Example 1. The fabric is rinsed in water and dried in air. The resulting fabric, modified by the aluminum chelate of bound allyl acetoacetate, weights 1.642 parts.

EXAMPLE 3

Fabrics of 66 nylon are folded to a thickness of 0.024 g./cm.$^2$ and are wet out with allyl acetoacetate, wrapped in aluminum foil and exposed to 500 watt-sec./cm.$^2$ of 2 mev. electron radiation from a Van de Graaff generator during a period of about one hour. The samples are exposed on an aluminum table that is traversed under the electron beam forty times with a total exposure to the beam of about 45 seconds. The fabrics are aired and conditioned at 23° C. and 50% relative humidity overnight. They are weighed and found to have gained between six and seven percent in weight.

One fabric (A) is treated in hot xylene with an equivalent of ferric acetonylacetonate and another (B) with an equivalent of nickel acetonylacetonate based on the allyl acetoacetate present. As a control an untreated nylon fabric (C) is treated in a hot xylene solution of ferric acetonylacetonate. The fabrics are removed from the xylene solutions, rinsed several times in acetone and let dry. Fabric C is merely stained brownish yellow whereas A is light to medium brown in color indicating appreciable chelation of iron with the allyl acetoacetate attached to the fabric. Fabric B is light green in color from the chelation of nickel with the allyl acetoacetate attached to the fabric.

The hole melting resistance of both A and B is greater than that of controls as shown in the following table:

*Hole Melting Resistance of Fabrics*

| Fabric code | Hole melting resistance,[1] °C. | |
|---|---|---|
| | First damage | Complete damage |
| A | 320 | 470 |
| B | 300 | 400 |
| C | 290 | 360 |
| Untreated nylon | 300 | 360 |

[1] Determined by dropping preheated glass marbles onto the fabric. First damage is taken as the lowest temperature at which the fabric is discolored and partially fused. Complete damage is taken as the lowest temperature at which the marble melts a hole in the fabric and drops through.

EXAMPLE 4

1.83 parts 66 nylon (N) and 1.97 parts polyethylene terephthalate fiber (D) fabrics are evacuated for 1 hour at 100° C. in a glass tube having a wall thickness of 0.11 cm. The average thickness of fabric in the tube is 0.31 g./cm.$^2$. The tube is flushed with nitrogen and 4 parts of freshly distilled vinyl salicylate is introduced. The tube is cooled to 0° C., evacuated to 0.04 mm., heated 1 hour at 100° C. and let stand 3 days at room temperature. The tube is reheated to 100° C. during 5 minutes and immediately exposed to 500 watt-sec./cm.$^2$ of 2 mev. electron radiation as in Example 3 while lagged with glass wool insulation on all sides except that exposed to the beam. The energy absorbed by the reactants based on a calculation similar to that in Example 1 is about 5×10$^7$ rads neglecting the partial dissipation and scattering of the beam by the glass container. The fabrics are removed from the tube and extracted overnight with acetone in a Soxhlet. The fabrics are soaped lightly, rinsed in distilled water, and conditioned at 23° C. and 50% relative humidity. They are found to have gained 57% in weight. Each is divided into three pieces.

One piece of each fabric is treated about 8 hours in a hot benzene solution containing an equivalent of tris(acetylacetono)Fe$^{+++}$ based on the vinyl salicylate attached to the fabric. Both fabrics become dark red with the formation of ferric chelate of the grafted vinyl salicylate on the fabric. They are rinsed in fresh benzene, let dry, rinsed in water, and let dry again. In tests with a burning cigarette they are highly resistant to hole melting relative to unirradiated and otherwise untreated fabrics. The fabrics irradiated in the presence of vinyl salicylate but not chelated also are resistant to hole melting but not as resistant as the above.

Another piece of each fabric is treated about 4 hours in a hot benzene solution containing an equivalent of aluminum isopropoxide based on the vinyl salicylate attached to the fabric. This treatment is repeated after addition of another equivalent of aluminum isopropoxide. The fabrics bearing the aluminum chelate of the bonded vinyl salicylate are rinsed in fresh benzene, let dry, rinsed in water and let dry. They have high resistance to hole melting relative to unirradiated and otherwise untreated control fabrics.

EXAMPLE 5

1.81 parts of 66 nylon fabric is folded to a thickness of 0.031 g./cm.$^2$ and is wet out with tris(allylacetoacetato)Al$^{+++}$ and 1–2 parts of water is added. The whole is wrapped in aluminum foil and exposed to 470 watt-sec./cm.$^2$ of 2 mev. electron radiation as in Example 3. Based on a calculation similar to that in Example 1 the energy absorbed by the reactants is about 4×10$^7$ rads. The fabric is washed in soapy water with mechanical working to remove surface polymer. Following conditioning the fabric is found to have gained 41% in weight. The fabric is submitted to ten launderings in a mechanically agitated washer for ½ hour each in water containing 0.125% of a commercial detergent at about 70° C. Its weight gain is then 28% as a result of further removal of polymer not directly attached to the fibers. After ten more launderings, the weight gain is 24% based, as in both cases above, on original untreated fabric weight. The increase is due to the aluminum chelate of allyl acetoacetate bonded to the nylon.

The laundered fabric has good resistance to hole melting. It is less prone to develop static than untreated nylon as shown by an electrical resistivity test. The logarithm of its resistivity is shown to be 12.8 as compared with above 13.3 for the control. In addition it possesses improved wickability and hence improved comfort when in contact with the skin as compared with untreated nylon. Wickability is measured by placing a drop of water on the fabric and noting the time required for it to soak in. Values of 38 and 500 seconds for the treated and control fabrics are observed.

EXAMPLE 6

1.77 parts of 66 nylon fabric is folded to a thickness of 0.031 g./cm.$^2$ and is wet out with 1 part of vinyl salicylate and wrapped in aluminum foil. The package is placed on a ¼" thick aluminum plate and covered with blotting paper to act as a heat insulator. The whole is heated 1 hour in a 100° C. oven, lagged thermally underneath and exposed at once to 100 watt-sec./cm.$^2$ of 2 mev. electron radiation during an elapsed time of only about 1.5 minutes such that the fabric is maintained at elevated temperature during irradiation. Based on a calculation similar to that in Example 1 the energy absorbed by the reactants is about 9×10$^6$ rads. The fabric is extracted with hot acetone to remove excess and unattached reagent. After rinsing in water and conditioning it is found to have gained 21% in weight.

The fabric is further treated for 2 hours in hot benzene containing an equivalent of aluminum isopropoxide based on the attached vinyl salicylate. Another equivalent of aluminum isopropoxide is added and heating is continued 1.5 hours more. The fabric bearing the aluminum chelate of the attached vinyl salicylate is rinsed in benzene, acetone and water in turn and allowed to dry. It is more resistant to hole melting than an unreacted control fabric and has a high wickability as shown by a wicking time of only 15 seconds for a drop of water.

Examples 1, 2, 3, 4 and 6 illustrate the radiation grafting of unsaturated ligands to polymers, followed by conversion of the ligand to a metal chelate thereof. Other unsaturated ligands which may be attached and chelated in the manner of this invention include p-vinylbenzyl acetoacetate, 2-cyanoallyl acetoacetate, methallyl acetoacetate and allyl benzoylacetate.

In the embodiment of this invention in which an unsaturated ligand is first bonded to an organic polymer by ionizing radiation, the resulting polyligand may be converted to the corresponding chelate by contacting it with ions of the desired metal. These ions may be furnished in the form of a solution of a corresponding inorganic or organic salt of the metal. When the metal is introduced as a solution of a salt of a strong acid, as in aluminum nitrate, chelate formation is brought about by raising the pH to about 8 or above, i.e., by the introduction of caustic. It is convenient and often preferred to furnish metal ions in the form of a preformed chelate of the desired metal, which chelate is less stable than the one to be formed with the polyligand. The latter procedure is illustrated in Examples 3 and 4. Metal ions may also be furnished in the form of a chelate of the metal with a volatile ligand, in which case the transfer of the metal to the bonded ligand is accomplished by volatilizing the volatile ligand.

Most of the unsaturated ligands employed in this invention are organic liquids and as such tend to have a swelling action on the organic polymer substrate. It will thus be readily understood that attachment of the ligand by the action of the radiation will occur both on the surface and in the body of the polymer. When the ligand is converted to its metal chelate subsequent to bonding by irradiation, surface chelate attachment dominates over but does not exclude chelate attachment within the body of the modified polymer.

Since obvious modifications in our invention will occur to those skilled in the art, we propose to be bound solely by the appended claims.

The embodiments of the invention in which an exclusive property or privilege is claimed are defined as follows:

1. The process which comprises bonding, by means of irradiation with ionizing radiation having a minimum energy equivalent to 50 electron volts for a minimum dosage of 100 rads, to a preshaped polymeric substrate a member of the group consisting of (1) esters of unsaturated alcohols having at least one center of nonaromatic carbon-to-carbon unsaturation and ligand acids, said esters being capable of forming metal chelates, and (2) preformed metal chelates of said esters, with the proviso that, when an ester is employed, the ester is converted to the chelate after being bonded to the substrate.

2. The invention of claim 1 in which the ionizing radiation is particle radiation.

3. The invention of claim 2 in which the ionizing radiation is electrons.

4. The invention of claim 1 in which the ionizing radiation is electromagnetic radiation.

5. The process which comprises sequentially (1) contacting a preshaped organic polymeric substrate with a metal chelate of an ester of a ligand acid and an unsaturated alcohol having at least one center of nonaromatic carbon-to-carbon unsaturation, and (2) bonding said metal chelate to the substrate by means of irradiation with ionizing radiation having a minimum energy equivalent to 50 electron volts for a minimum dosage of 100 rads.

6. The invention of claim 5 in which the ionizing radiation is electrons.

7. The process which comprises sequentially (1) contacting a preshaped organic polymeric substrate with an ester of a ligand acid and an unsaturated alcohol having at least one center of nonaromatic carbon-to-carbon unsaturation, (2) bonding said ester to the substrate by means of irradiation with ionizing radiation having a minimum energy equivalent to 50 electron volts for a minimum dosage of 100 rads, and (3) forming a metal chelate of said ester after it has been bound to the substrate.

8. The process which comprises bonding a salicylate of an unsaturated alcohol having at least one center of nonaromatic carbon-to-carbon unsaturation to preshaped nylon by means of ionizing radiation having a minimum energy equivalent to 50 electron volts for a minimum dosage of 100 rads and thereafter forming a metal chelate of the bound salicylate.

9. The process which comprises bonding an acetoacetate of an unsaturated alcohol having at least one center of nonaromatic carbon-to-carbon unsaturation to preshaped nylon by means of ionizing radiation having a minimum energy equivalent to 50 electron volts for a minimum dosage of 100 rads and thereafter forming a metal chelate of the bound acetoacetate.

10. The process which comprises bonding a salicylate of an unsaturated alcohol having at least one center of nonaromatic carbon-to-carbon unsaturation to preshaped polyethylene terephthalate by means of ionizing radiation having a minimum energy equivalent to 50 electron volts for a minimum dosage of 100 rads and thereafter forming a metal chelate of the bound salicylate.

11. The process which comprises bonding an acetoacetate of an unsaturated alcohol having at least one center of nonaromatic carbon-to-carbon unsaturation to preshaped polyethylene terephthalate by means of ionizing radiation having a minimum energy equivalent to 50 electron volts for a minimum dosage of 100 rads and thereafter forming a metal chelate of the bound acetoacetate.

12. An article of manufacture comprising a shaped organic polymeric substrate having grafted thereto an organic chelate of a metal and an ester of a ligand acid and an unsaturated alcohol having at least one center of nonaromatic carbon-to-carbon unsaturation.

13. The invention of claim 12 in which the article is fibrous.

14. The invention of claim 13 in which the article is a fabric.

15. The invention of claim 12 in which the article is a film.

16. An article of manufacture comprising a preshaped nylon substrate having grafted thereto a metal chelate of a salicylate of an unsaturated alcohol having at least one center of nonaromatic carbon-to-carbon unsaturation.

17. An article of manufacture comprising a preshaped nylon substrate having grafted thereto a metal chelate of an acetoacetate of an unsaturated alcohol having at least one center of nonaromatic carbon-to-carbon unsaturation.

18. An article of manufacture comprising a preshaped polyethylene terephthalate substrate having grafted thereto a chelate of a salicylate of an unsaturated alcohol having at least one center of nonaromatic carbon-to-carbon unsaturation.

19. An article of manufacture comprising a preshaped polyethylene terephthalate substrate having grafted thereto a chelate of an acetoacetate of an unsaturated alcohol having at least one center of nonaromatic carbon-to-carbon unsaturation.

20. An article of manufacture comprising a preshaped nylon substrate having grafted thereto a metal chelate of vinyl salicylate.

21. The article of manufacture of claim 20 wherein the metal chelate is the aluminum chelate.

22. The article of manufacture of claim 21 wherein the metal chelate is the ferric chelate.

23. An article of manufacture comprising a preshaped nylon substrate having grafted thereto a metal chelate of allyl acetoacetate.

24. The article of manufacture of claim 23 wherein the metal chelate is the aluminum chelate.

25. The article of manufacture of claim 23 wherein the metal chelate is the ferric chelate.

26. The article of manufacture of claim 23 wherein the metal chelate is the nickel chelate.

27. An article of manufacture comprising a preshaped polyethylene terephthalate substrate having grafted thereto a metal chelate of vinyl salicylate.

28. The article of manufacture of claim 27 wherein the metal chelate is the aluminum chelate.

29. The article of manufacture of claim 27 wherein the metal chelate is the ferric chelate.

References Cited in the file of this patent

UNITED STATES PATENTS

| | | |
|---|---|---|
| 2,459,896 | Schwarz | Jan. 25, 1949 |
| 2,465,296 | Swiss | Mar. 22, 1949 |
| 2,615,860 | Burgess | Oct. 28, 1952 |
| 2,839,421 | Albisetti | June 17, 1958 |
| 2,897,092 | Miller | July 28, 1959 |

FOREIGN PATENTS

| | | |
|---|---|---|
| 1,079,401 | France | Dec. 12, 1945 |

OTHER REFERENCES

Modern Plastics, vol. 32, No. 1, September 1954 (pages 143, 144, 146, 150, 229–233 pertinent).

UNITED STATES PATENT OFFICE
CERTIFICATE OF CORRECTION

Patent No. 3,068,122            December 11, 1962

Edward T. Cline et al.

It is hereby certified that error appears in the above numbered patent requiring correction and that the said Letters Patent should read as corrected below.

Column 8, lines 48 and 53, before "chelate", each occurrence, insert -- metal --.

Signed and sealed this 3rd day of September 1963.

(SEAL)
Attest:

ERNEST W. SWIDER
Attesting Officer

DAVID L. LADD
Commissioner of Patents